Dec. 20, 1955     C. V. STALLER     2,727,359
FOLLOW-UP CONTROL

Filed June 28, 1954     4 Sheets-Sheet 1

INVENTOR.
CHARLES V. STALLER
BY
RICHEY, WATTS, EDGERTON & McNENNY
ATTORNEYS

Dec. 20, 1955   C. V. STALLER   2,727,359
FOLLOW-UP CONTROL
Filed June 28, 1954   4 Sheets-Sheet 2
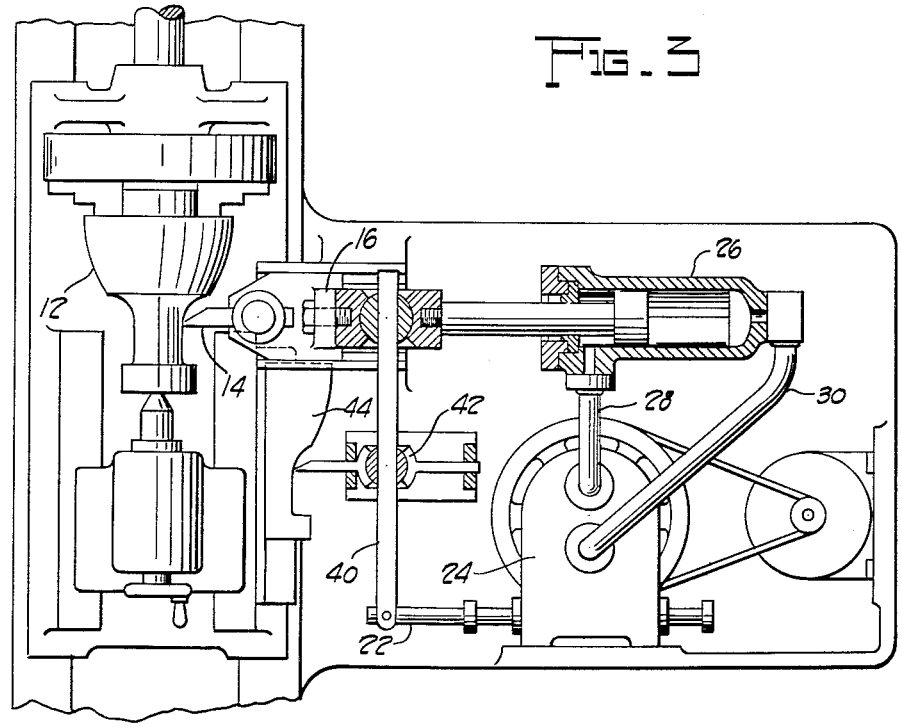
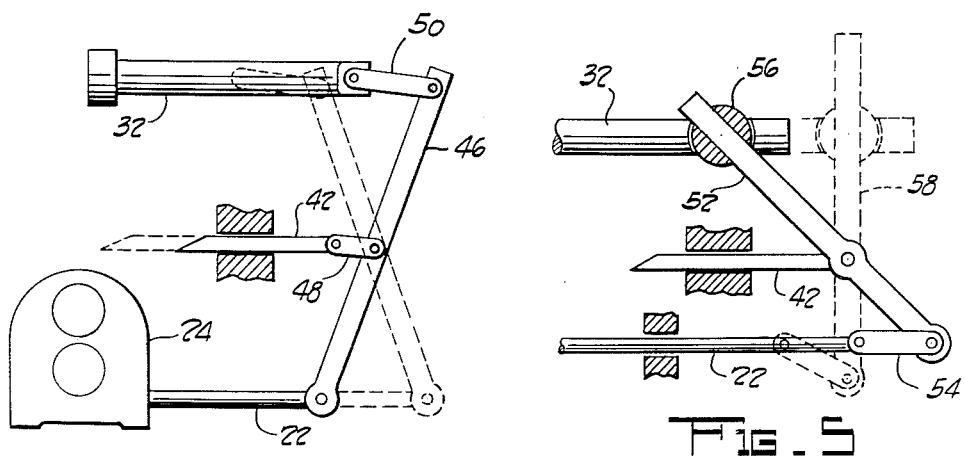
INVENTOR.
CHARLES V. STALLER
BY
RICHEY, WATTS, EDGERTON & McNENNY
ATTORNEYS

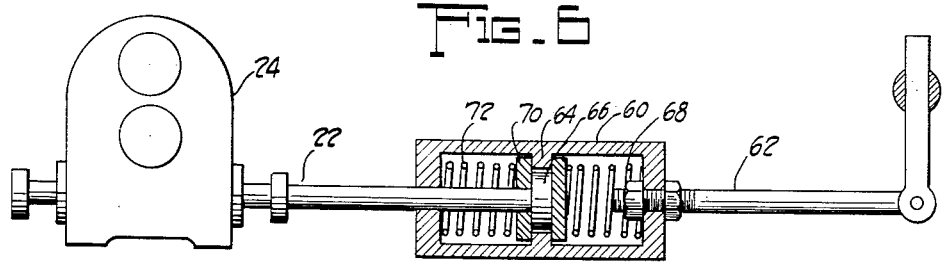
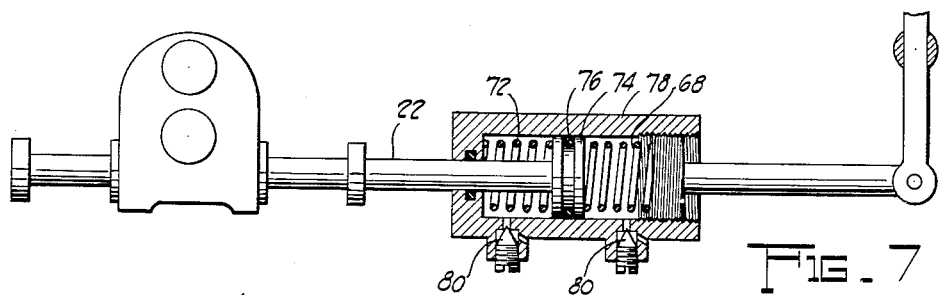
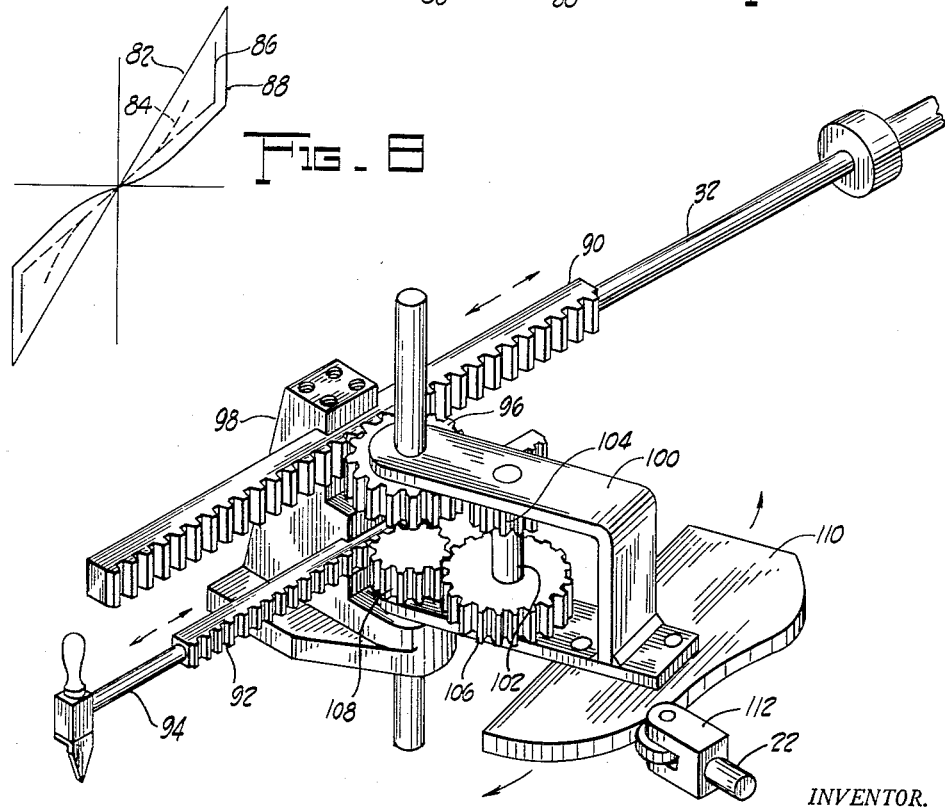

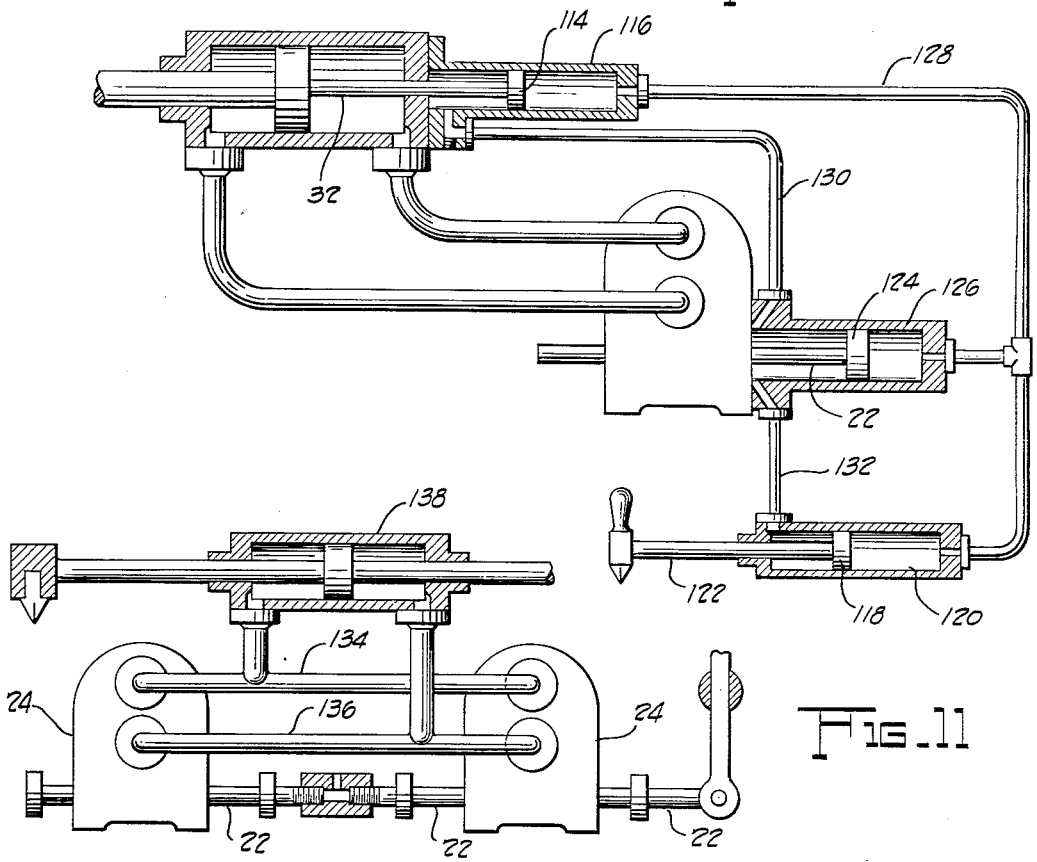
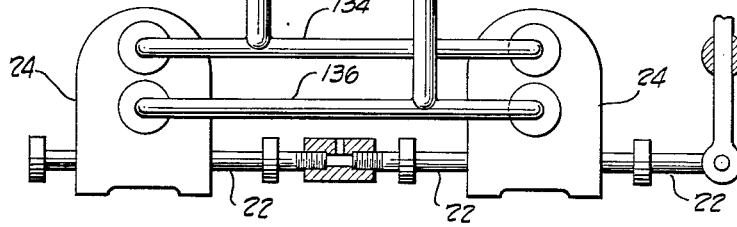
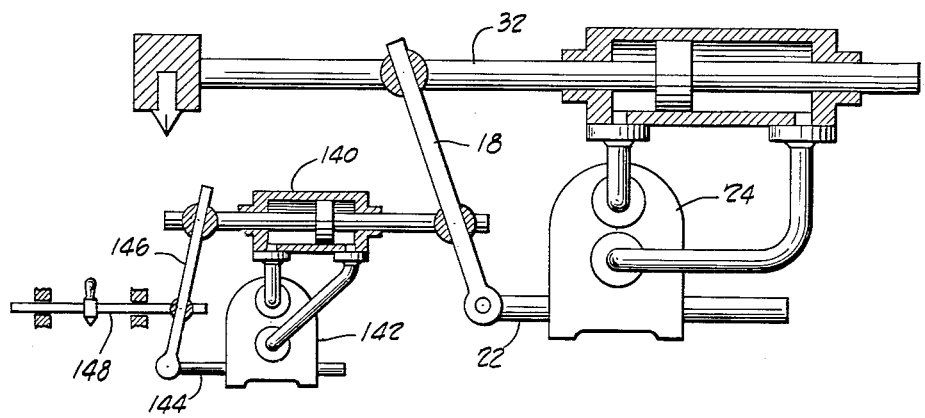

United States Patent Office 2,727,359
Patented Dec. 20, 1955

2,727,359
FOLLOW-UP CONTROL
Charles V. Staller, Barberton, Ohio
Application June 28, 1954, Serial No. 439,633
3 Claims. (Cl. 60—52)

This invention relates to a hydraulic follow-up control and more specifically to a hydraulic follow-up control utilizing a variable delivery pump in combination with a comparator to provide a desired fluid displacement which may be used as a control or a power source in positioning and operating machines.

The provision of the variable delivery pump has resulted in higher power, higher accuracy, and higher efficiency in operating a machine being controlled by a follow-up system. The characteristics of the variable delivery pump is such that the displacement is a function only of the position of the control and is not affected by the pressure of the out-put and the load thereon. It follows therefore that the tool or other device being moved by the pump is positioned at a speed directly related to the position of the control and has no relation to the pressure required to move the tool. The pressure required to produce the motion adjusts itself automatically to the resistance and does not affect the regulation.

The same is not true of comparators wherein pressure is provided by an accumulator or a pump and the control cycle is regulated by a valve. In that case the available pressure must be above the maximum required and must be reduced by throttling as required by varying resistance of the cycle in order to control speed and position of the element being moved. This throttling obviously represents loss of energy since no energy can be returned to the pump or accumulator. Further an accurate adjustment cannot be made since the forces on the piston in the case of a reciprocating hydraulic motor device directly affect the pressure and therefore the speed in a given throttling position. As a result, the rate of adjustment made by the comparator is directly affected by the resistance which the piston meets which cannot be accordingly controlled or anticipated.

Accordingly it is an object of this invention to provide the control system in which the delivery of the controlling fluid is directly related to the position of the comparator apparatus.

Another object of this invention is to provide a hydraulic control for a reciprocating element in which the pressure available in a power supply is automatically proportioned to equal the resistance and the speed of travel is not affected by the load being reciprocated.

A still further object of this invention is to provide a hydraulic regulator system wherein the accuracy and speed of adjustment of the positioning of a tool or other element in a machine are independent from the resistance to movement of the tool or other element.

Another important object of this invention is to provide a hydraulic control system in which a comparator for a reciprocating element of a machine controls the delivery of hydraulic fluid for the drive for the element in such a manner that the element follows the comparator motion without the usual lag.

Another object of this invention is to provide a hydraulic control in which a comparator is directly connected to the control of a variable delivery pump in such a manner that the volume of output is controlled to a high value when speed is required to obtain rapid positioning with positive no-flow characteristics when the desired position has been reached.

Other objects and advantages more or less ancillary to the foregoing and the manner in which all the various objects are realized will appear in the following description which, considered in connection with the accompanying drawings, set forth the preferred embodiment of the invention.

In the drawings:

Figure 3 is a hydraulically copying control for a lathe tool;

Figure 4 is a schematic view of a hydraulically controlled tool positioner;

Figure 5 is a schematic view of a hydraulically controlled tool positioner;

Figure 6 is a sectional view of a control link;

Figure 7 is a sectional view of a modified control link;

Figure 8 is a diagram showing characteristics of the control;

Figure 9 is a perspective view of a comparator assembly;

Figure 10 is a diagrammatic view of a control system using displacement of hydraulic fluid as the operating medium;

Figure 11 is a diagrammatic view of a control system utilizing two variable delivery pumps; and Figure 12 is a diagrammatic view of a control system utilizing two variable delivery pumps in series.

Figure 1:
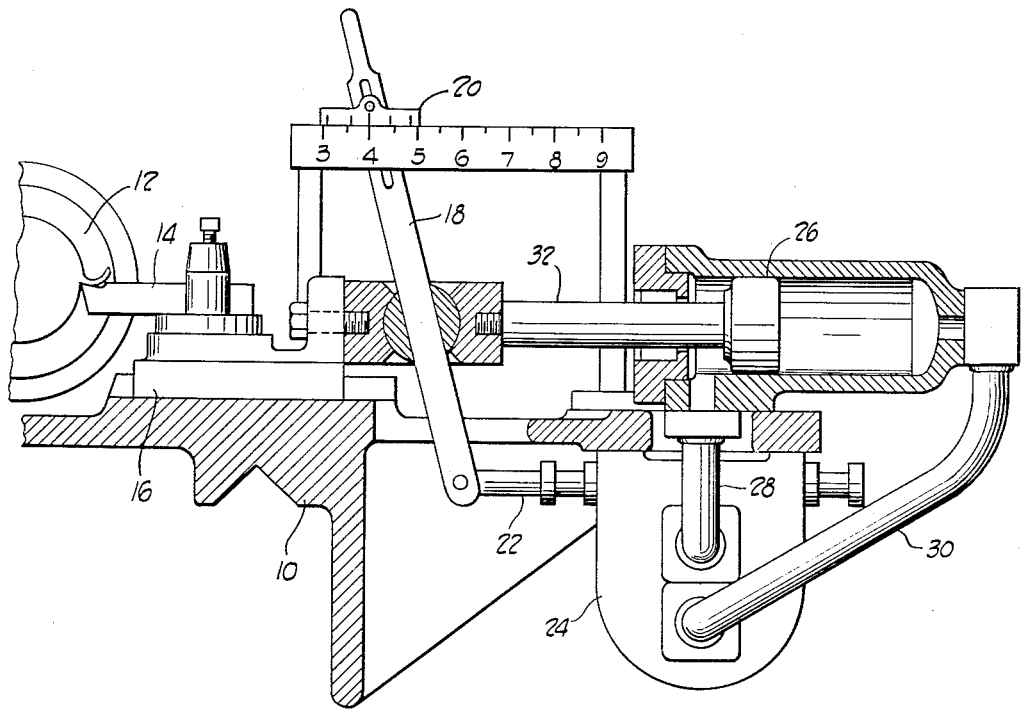
Figure 1 is a diagrammatical view of a hydraulically controlled tool on a lathe.

Referring first to Figure 1, a machine tool of conventional nature is shown therein having frame 10. A work piece 12 is carried for engagement by the tool 14 mounted on a tool slide 16. The position of the tool 14 is determined by the location of the lever 18 as indicated by the simple indicator assembly 20 associated therewith. The lever 18 is pivotally and slidably mounted on the tool slide 16. One end of the lever 18 is affixed to a control rod 22 which is a part of a variable delivery pump 24 and positions the mechanism therein to regulate the rate of delivery of fluid from the pump 24. A hydraulic piston and cylinder assembly 26 is connected to the pump 24 by conduits 28 and 30 connected to each end of the cylinder assembly 26. A piston rod 32 joins the piston with the tool slide 16 and transmits motion thereto when a certain volume of fluid under pressure is transmitted to the cylinder 26 by the pump 24.

Figure 2:
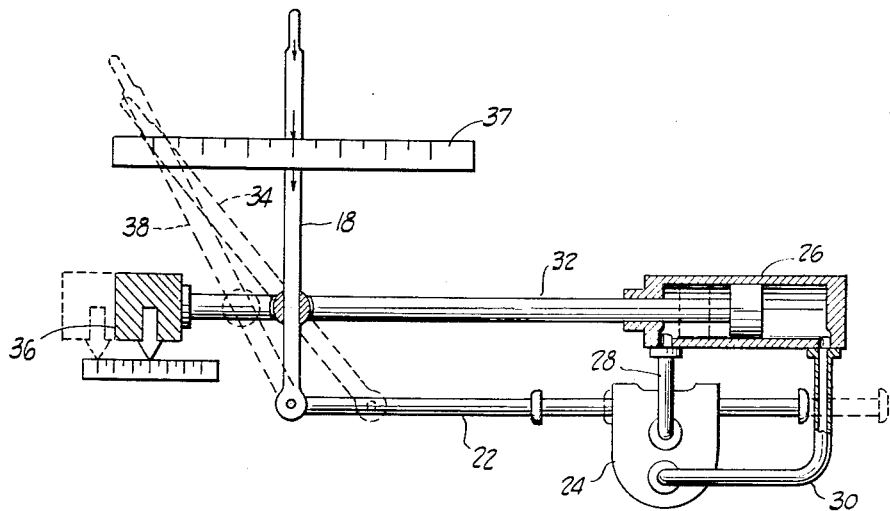
Figure 2 is a diagrammatical view of the control shown in Figure 1 in alternate positions.

The operation of the device is shown diagrammatically in Figure 2 wherein the lever 18 is shown in the full line position with the control in a stable location. When the lever 18 is moved to the dotted line position 34 the control rod 22 would be shifted since the piston rod 32 is stationary. When the control rod 22 is moved, the control mechanism of the pump 24, is actuated and the pump commences to discharge fluid through the conduit 30 thereby moving the piston rod 32 to the left. This movement continues until the control rod 22 is again in the neutral position at which time the pump ceases to discharge fluid and the tool is in the desired position as shown by the indicator 36, corresponding to the adjusted position on scale 37. When this condition is obtained the lever 18 is in the dotted line position 38.

The speed with which the piston rod moves and consequent adjustment of the machine, as called for by the change in location of the control lever which may be accomplished by hand or by a motion generating device, is proportional to the output of the variable delivery pump 24. This sensitivity and speed of the follow up motion can be regulated by controlling the operational speed of the variable delivery pump 24.

When the pump 24 supplies a hydraulic motor which is connected to loads having high inertia, a flywheel operably connected to the pump shaft will function to receive energy from the pump and return energy to the pump during cyclical operation of the drive system. Such a flywheel materially increases the overall efficiency of the drive and also reduces the peak power requirement for accelerating the load.

In Figure 3 the control structure shown in Figures 1 and 2 is shown with the modification that the lever 40 is positioned by a copying device rather than by hand.

Lever 40 has a follower 42 located intermediate the ends thereof which engages a profile pattern 44. As the follower 42 moves along the pattern 44, motion is generated in the lever 40 which positions the control rod 22 thereby actuating the pump and positioning the slide 16 by attracting cylinder 26. As the slide 16 moves to the new position, the lever engaged therewith is repositioned to return the control rod 22 to neutral. Thus the slide 16 and the tool 14 follows in proportional scale the precise profile which is established by the pattern 44. The scale can be varied by moving the follower assembly 42 toward or from the control rod 22. The lever comparator assembly functions to maintain the position of the tool in constant relation to the position of the follower 42.

Modifications of the lever comparator assembly are shown in Figures 4 and 5 wherein linkages and slides are incorporated to achieve the desired rate of adjustment characteristics shown in Figure 4. The lever 46 is connected to the control rod 22 of the pump pivotally. The follower 42 is attached to the lever 46 by a link 48 and the piston rod 32 is connected to the lever 46 by a longer link 50. Relative lengths of the links 48 and 50 are proportional to their relative distance from the pivoted connection to the control rod 22. In this modification as well as in all comparators shown, the motion of the tool is exactly proportional to the generating motion.

In Figure 5, the lever 52 is pivotally mounted on the profile follower 42 and is connected to the control rod 22 by a link 54. The opposite end of the lever 52 to the link 54 is slidable through a bushing 56 which is rotatably mounted in the piston rod 32. As the lever 52 rotates about the pivot on the follower 42, it slides relative to the bushing 56 and thereby becomes shortened or lengthened as to its radius of operation. The link 54 connects the end of the lever 52 to the control rod 22 in such a manner that the position of the lever 52 is followed by and is directly related to the position of the control rod 22. With this arrangement it can be seen that the restoring motion for the control rod 22 is small for a given amount of motion in the piston rod 32 in the position shown in full line and is substantially increased in the dotted line middle position 58. The result of using this type of comparator is a more rapid correcting motion until the piston is shifted proximate the desired location.

In order to enable the use of a comparator with a steeper characteristic of rate of regulation to the amount of displacement required, an equalized coupling is included in the control rod 22 for the pump 24. The coupling includes a housing 60 affixed to a portion 62 of the rod 22. A centrally located flange 64 is formed internally of the housing 60 for engagement by a head 66 formed on the end of the rod 22. A compression spring 72 biases the head 66 into its normal position in engagement with the flange 64. A perforate plate 70 is freely slidable on the rod 22 and engages both the flange 64 and the head 66 in the normal position. The plate 70 is maintained in the normal position by the compression spring 72 with one end against the housing 60 and the other end against the plate 70. The springs 68 and 72 center the head 66 in the housing 60 but may be overcome by additional force which may occur when the travel of the comparator exceeds the travel of the control rod 22. The effect of the coupling is to maintain the restoration flow from the pump 24 at a maximum while the comparator is operating through a portion of its recovery movement. By utilizing this device it is possible to maintain a very rapid rate of adjustment until the stabilization point is very closely approached. To further modify the characteristic of rate of adjustment the coupling shown in Figure 7 has included a dashpot effect in addition to the springs. This type of coupling is shown in Figure 7 and has the head 74 of the rod 22 functioning as a piston. An O-ring seal 76 prevents leakage past the head 74 when air is compressed in the cylinder type housing 78. An adjustably restricted air vent 80 is located at each end of the housing 78 respectively and releases the air from the housing 78 slowly as required by the type of action desired. The approach of the control rod 22 toward the neutral position as determined by the springs 68 and 72 is retarded by the air or hydraulic throttling through the vents 80. The springs centralize the head 74 eventually and establish the stabilized position after the pressure in the housing 78 has been bled-off. By adjusting the spring load and the adjustable vents the coupling is tuned in such a manner that neither hunting nor overriding will occur. With these adjustments available it is possible to establish a regulation characteristic as desired for maximum efficiency in the operation of the particular machine with which it is used.

A diagram showing the various characteristic curves as obtained by the control systems shown in Figures 4, 5, 6 and 7 is illustrated in Figure 8. In the diagram the horizontal coordinate represents the rate of regulation and the vertical coordinate represents the amount of adjustment to be made. The straight line 82 represents the regulation which would be obtained by the control illustrated in Figure 4 wherein the comparator lever utilizes linkage attachments. The characteristic obtained by the control assembly illustrated in Figure 5 wherein one end of the lever incorporates a slide is shown by the curve 84. When the spring loaded coupling as shown in Figure 6 is used with a simple lever type comparator characteristic is obtained as shown by the curve 86 in Figure 8. A still further type of curve 88 is obtained by the use of the coupling shown in Figure 7 wherein the air regulation modifies the actuation of the control rod 22. It is noted that in this curve the rate of adjustment around neutral position of the control rod is larger for the amount of adjustment required than is achieved in any of the other modifications. In some types of machines this is particularly desirable if accuracy is to be maintained and speed of operation is important.

For illustration purposes the embodiments previously described in this specification have utilized a simple lever type of comparator. However, more complicated and flexible types of comparators are equally adaptable for use with the variable delivery pump follow-up control system. In Figure 9 a planetary gear type of comparator is illustrated wherein the piston rod 32 is affixed to rack 90 which moves with the motion to be controlled. A similar rack 92 is affixed to the regulating or generating control rod 94. The rack 90 drives a gear 96 which is rotatably mounted on a stationary frame 98. A cage 100 is rotatably mounted on the same center as the gear 96 for swinging through an arc relative to the stationary frame 98. The cage 100 carries a shaft 102 for rotation, the shaft 102 having a pinion 104 affixed thereon in mesh with the gear 96. A second pinion 106 is mounted on the shaft 102 and meshes with a gear 108. The gear 108 is rotatably carried by the frame 98 on the center of rotation of the cage 100 and engages the rack 92. This planetary gearing arrangement sets up an arcuate swing in the cage 100 whenever the ratio of motions of the racks 90 and 92 differs from that of the gear train. This swing can be made as large as desired for a small amount of motion in either of the racks 90 and 92 by establishing the desired gear ratio between the gears and pinions. Accordingly, the sensitivity of the comparator can be controlled within wide limits by adjusting gear ratios and the consequent amount of swing of the cage 100 for a given amount of rack travel. A further modification of the control can be made by utilization of a cam 110 mounted on the cage 100. A follower 112 is carried by the control rod 22 and establishes the motion in the pump control which is set up by the travel of the cam surface in engagement with the follower 112. A comparator of this type, therefore, can be arranged to provide regulation and rate of response as desired when coupled with a variable delivery pump as the medium for supplying the controlling effort. The virtue of the variable delivery pump lies in the positive displacement and the immediate response so that the fluid displaced thereby is in direct relation to the motion set up in the control rod 22.

In Figure 10, a hydraulic type of comparator is illustrated wherein fluid under pressure accomplishes the operations provided by mechanical structure in the above described comparators. Piston rod 32 is connected to a piston 114 which travels in cylinder 116 in conformity with the motion to be controlled. A similar piston 118 travels in a cylinder 120, the piston 118 being connected to the motion generating element 122. The control rod 22 of the pump is affixed to a piston 124 travelling in a cylinder 126. One end of each of the cylinders 116, 120 and 126 is connected by a conduit 128 which intercommunicates with each of the cylinders for equalizing the pressure against the pistons 114, 118, and 124 respectively. The opposite ends of the cylinders 116 and 126 are interconnected by a conduit 130 and a conduit 132 interconnects the opposite ends of cylinders 120 and 126. It follows that relative motion in the generating element 122 and the piston rod 32 will produce a motion in the control rod 22 since displacement of fluid will occur which will cause the translation of piston 124 and the rod 22. Accordingly, a desired motion set up in the generating element 122 will first be transmitted to the pump control rod 22 and through pump displacement to the piston rod 32, thus establishing movement of the piston 114 which through the hydraulic connection will return the pump control rod 22 to the stabilized position.

The control of a variable delivery pump has one position in which the pump is in a neutral or no-flow condition. However, this condition is theoretical only since there is a certain amount of lost motion in the control mechanism which regulates the displacement of the pump. To actuate the mechanism in the pump to start the pumping action requires some movement of the control equipment. This is an effect which reduces the sensitivity and accuracy of the follow up control to some extent and also slows the action thereof. Where it is desirable to obtain the extreme sensitivity which is available with the controls disclosed herein, two variable delivery pumps may be connected in parallel as shown in Figure 11. In this embodiment two pumps 24 have their discharge passages connected by conduits 134 and 136 and each of conduits 134 and 136 is connected to an end of the operating cylinder 138. The control rods 22 for each pump 24 are connected in such a manner that at least one of the pumps 24 is pumping at all times. At neutral, oil circulates between the two pumps only. Accordingly, there is no condition in which the slightest movement of the control rod 22 will not produce immediate and positive effect in the cylinder 138. The use of two pumps has other advantages including the ability to cool the hydraulic fluid in the pumps during periods of idling.

This invention also contemplates the use of a variable delivery pump assembly as a part of the comparator for a second variable delivery pump which may function as the power supply for actuating the load. This is accomplished by driving the control rod 22 on the pump 24 by a piston and cylinder assembly 140 as shown in Figure 12. The comparator lever 18 senses the motion of the piston rod 32 as indicated in the device shown in Figure 3. However, the transmission of the generated motion is accomplished by a pump 142 which has its control rod connected to a comparator lever 146. The generating element 148 produces the motion in the control rod 144 which causes the pump 142 to deliver fluid in the desired direction to cause motion in the comparator lever 18 and thence to the control rod 22. Upon movement then of the piston rod 32 the lever 18 would restore the control rod 22 to neutral and the piston rod 32 would be held in the new position established by the cylinder assembly 140. This particular assembly finds virtue in a use wherein pump 24 must be extremely large to handle the loads on and motions of the piston rod 32 and any form of ordinary comparator mechanism would require too large a generating force for motion even indirectly, with the large pump control 24. By using the second pump any of the various comparators disclosed herein could be used for the control of the motion and the effort from the cylinder assembly 140 would be sufficient to adequately control any size of apparatus.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A follow up control for a prime mover having a reciprocating element, said control comprising a plurality of variable delivery pumps, interconnected control means for each pump for varying and reversing the flow from each pump concurrently, follow up comparator means interconnecting said moving element and said pump control means, and motion generating means connected with said comparator means.

2. A follow up control for a prime mover having a moving element, said control comprising a variable delivery pump, control means on the pump for varying and reversing the flow from the pump, follow up comparator means interconnecting said moving element and said control means, motion generating means connected with said comparator means comprising a hydraulic motor, a second variable delivery pump connected with said hydraulic motor, control means on the second pump for varying and reversing the flow from the second pump for positioning the hydraulic motor, comparator means interconnecting said hydraulic motor and said second pump control means, and motion generating means connected with said comparator means for the hydraulic motor and the second pump control means.

3. A follow up control for a prime mover having a moving element, said control comprising a variable delivery pump, control means on the pump for varying and reversing the flow from the pump, a follow up lever type comparator interconnecting said moving element and said control means, motion generating means connected with said comparator comprising a hydraulic motor, a variable delivery pump connected with said hydraulic motor, control means on the second pump for varying and reversing the flow from the second pump for positioning the hydraulic motor, comparator means interconnecting said hydraulic motor and said second pump control means, and motion generating means connected with said comparator means for the hydraulic motor and the second pump control means.

References Cited in the file of this patent

UNITED STATES PATENTS

| 1,056,194 | Martineau | Mar. 18, 1913 |
| 2,028,089 | Erling | Jan. 14, 1936 |
| 2,273,721 | Muller | Feb. 17, 1942 |
| 2,391,996 | Muller | Jan. 1, 1946 |
| 2,601,760 | Swartz | July 1, 1952 |

FOREIGN PATENTS

| 392,897 | Great Britain | Aug. 19, 1931 |